(12) United States Patent
Miyake

(10) Patent No.: US 8,610,921 B2
(45) Date of Patent: Dec. 17, 2013

(54) SYSTEMS AND METHODS FOR MESSAGE BASED DETERMINATION OF PRINTER CAPABILITIES

(75) Inventor: Kiyoshi Miyake, Superior, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 926 days.

(21) Appl. No.: 12/495,363

(22) Filed: Jun. 30, 2009

(65) Prior Publication Data

US 2010/0328707 A1 Dec. 30, 2010

(51) Int. Cl.
*G06F 3/12* (2006.01)

(52) U.S. Cl.
USPC .......................................................... 358/1.15

(58) Field of Classification Search
None
See application file for complete search history.

(56) References Cited

U.S. PATENT DOCUMENTS

| | | | |
|---|---|---|---|
| 5,025,399 A * | 6/1991 | Wendt et al. | 358/1.18 |
| 2003/0163380 A1 | 8/2003 | Vaccarelli et al. | |
| 2004/0061890 A1* | 4/2004 | Ferlitsch | 358/1.15 |
| 2004/0212821 A1 | 10/2004 | Kimura | |
| 2005/0049837 A1* | 3/2005 | Reese et al. | 702/188 |
| 2007/0146732 A1* | 6/2007 | Piazza et al. | 358/1.1 |
| 2011/0060647 A1* | 3/2011 | Weaver et al. | 705/14.49 |

FOREIGN PATENT DOCUMENTS

JP 2003-036227 A 2/2003

OTHER PUBLICATIONS

Notice of Abandonment dated Aug. 28, 2012, in related U.S. Appl. No. 12/495,340, filed Jun. 30, 2009, Kiyoshi Miyake.
Office Action dated Feb. 15, 2012, in related U.S. Appl. No. 12/495,340, filed Jun. 30, 2009, Kiyoshi Miyake.
U.S. Appl. No. 12/495,340, filed Jun. 30, 2009.

* cited by examiner

*Primary Examiner* — Marivelisse Santiago Cordero
*Assistant Examiner* — John Wallace
(74) *Attorney, Agent, or Firm* — Finnegan, Henderson, Farabow, Garrett & Dunner, L.L.P.

(57) ABSTRACT

Methods disclosed facilitate the identification of printers from among a plurality of network accessible printers based on information about at least one printer sub-state using commonly available messaging techniques such as e-mail. In some embodiments, an email message, which includes queries with search criteria pertaining to the at least one printer sub-state, is received and a sub-state database is queried based on the search criteria pertaining to the printer sub-state to obtain a set of printers that satisfy the search criteria. The sub-state database comprises information that correlates printer identification information with corresponding printer sub-state information of the plurality of network accessible printers. The response to the query is used to respond to the e-mail request with the e-mail response including identification information about printers in the set of printers that satisfy the search criteria.

25 Claims, 4 Drawing Sheets

SYSTEMS AND METHODS FOR MESSAGE BASED DETERMINATION OF PRINTER CAPABILITIES

BACKGROUND

1. Field of the Invention

The present invention relates to the field of printing and in particular, to systems and methods for determining the capability of networked printing devices using commonly available electronic messaging techniques.

2. Description of Related Art

Computer printers, which are ubiquitous in most modern organizations, permit the quick printing of stored documents. In organizations, which have a large number of physically distributed printers, it may difficult to determine the capabilities of various printers. For example, if a user in the organization wants a color printer capable of printing in high resolution, there is no easy way for the user to locate a printer that provides the desired capabilities. The problem is compounded if the user happens to be a visitor to that organizational facility and if the organization has a large number of printers available. Typically, in such situations the user asks a system administrator for printer capability information to identify a printer with the desired capabilities. A printer driver for the identified printer is then installed on to the user's computer. Finally, the user configures the identified printer appropriately before sending a print job to the printer.

The process described above to locate and utilize printers with specific capabilities can be cumbersome and lengthy. Moreover, the process may also involve technical support staff to help install drivers on the user's computer, even for a one-time use of a specific printer. Finally, there is no easy mechanism for the system administrator to apprise individual users of changes in capability as older printers are retired and new printers deployed. Therefore, the ability to quickly obtain accurate and current printer capability information would facilitate the utilization of printers, increase user productivity, and greatly simplify system administration. Accordingly, there is a need for systems and methods that facilitate the determination of printing device capability.

SUMMARY

Consistent with embodiments disclosed herein, systems and methods for obtaining printer information are presented. In some embodiments, a method for identifying printers from among a plurality of network accessible printers based on information about at least one printer sub-state comprises: receiving an email message, wherein the e-mail message comprises at least one query with search criteria pertaining to the at least one printer sub-state; querying a database based on the search criteria pertaining to the at least one printer sub state to obtain a set of printers that satisfy the search criteria, wherein the database comprises information that correlates printer identification information with corresponding printer sub-state information of the plurality of network accessible printers; and responding to the e-mail request, wherein the e-mail response comprises identification information about printers in the set of printers that satisfy the search criteria. The printer state comprises a plurality of sub-states and the at least one sub-state is one of the plurality of printer sub-states.

Embodiments also relate to software, firmware, and program instructions created, stored, accessed, or modified by processors using computer-readable media or computer-readable memory. These and other embodiments are further explained below with respect to the following figures.

DETAILED DESCRIPTION

In accordance with embodiments disclosed herein, systems and methods for automatically determining the capabilities of networked printing devices are presented.

Figure 1:
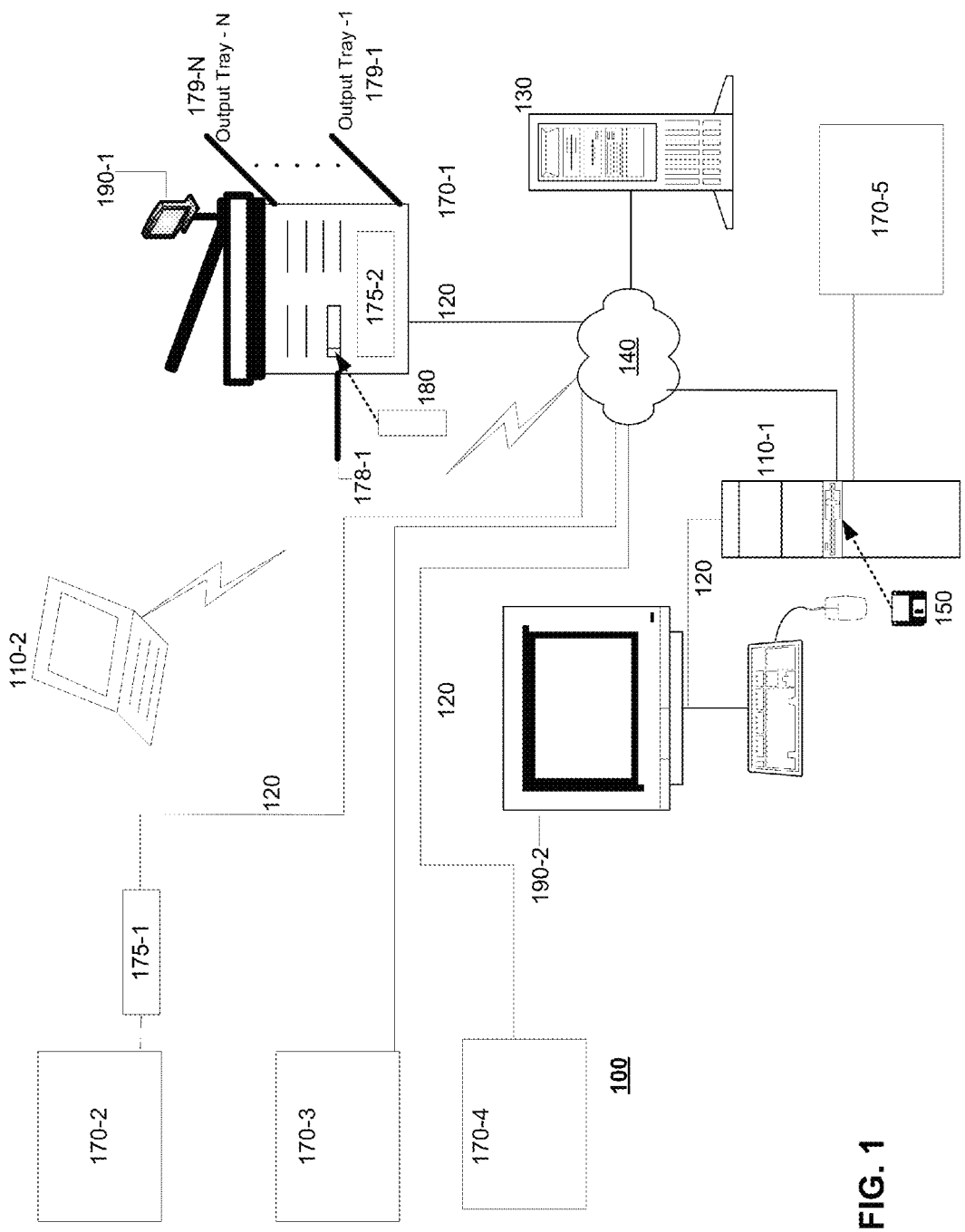
FIG. 1 shows a block diagram of exemplary system for obtaining the capabilities of networked printers and for printing documents on the printers using messaging techniques.

FIG. 1 shows a block diagram of exemplary system 100 for obtaining the capabilities of networked printers and for printing documents on the printers using messaging techniques. A computer software application for obtaining printer capability and facilitating printing on printers with the requisite capabilities may be deployed on a network of computers 110, servers 130, and/or printers 170 that are connected through communication links that allow information to be exchanged using conventional communication protocols and/or data port interfaces.

As shown in FIG. 1, exemplary system 100 includes computers or computing devices 110, printers 170, and server 130. Network 140 may include subnets, Local Area Networks ("LAN"s), and/or Wide Area Networks ("WAN"s). Further, network 140 may also include modems, routers, repeaters, and other communication devices (not shown) that permit devices that are coupled to a network 140 to communicate with other devices over wired or wireless connections in accordance with the policies set by a network administrator.

In general, computing device 110 may be a computer workstation or desktop computer (e.g. 110-1), laptop or portable computer, handheld device, or any other mobile computing device (e.g. 110-2) capable of being used in a networked environment. Computing devices 110-1, 110-2, and/or server 130 may be capable of executing software (not shown) that facilitates obtaining the capabilities of individual printers and processing print requests for printers 170-1 through 170-5.

Computing devices 110 and server 130 may contain removable media drives 150. Removable media drives 150 may include, for example, 3.5 inch floppy drives, CD-ROM drives, DVD ROM drives, CD±RW or DVD±RW drives, USB flash drives, Memory Sticks™, Secure Digital High Capacity ("SDHC") cards, and/or any other removable media drives consistent with embodiments of the present invention. Portions of software applications may reside on removable media and be read and executed by computing devices 110-1, 110-2, and/or server 130 using removable media drive 150. In some embodiments, intermediate and final results and/or reports generated by applications may also be stored on removable media.

Printers 170 (such as printers 170-1 through 170-5) may be laser printers, ink jet printers, LED printers, plotters, and of various other types. From a functional perspective, printers 170 may take the form of computer printers, facsimile machines, digital copiers, multi-function devices, and/or various other devices that are capable of printing documents. In some embodiments, printers 170 may also support Management Information Bases ("MIB"s), which can be based on Requests for Comments ("RFC"s) issued by standard setting bodies. In some embodiments, the information in the MIB may pertain to descriptions, alerts, and/or status of various parameters tracked by printer 170. Information in the MIB may also include printer capability information. The information in the MIB may be seen as indicative of the state of the printer.

Connection 120 couples computing device 110, printers 170-1-170-5 to network 140. Connection 120 may be implemented as a wired or wireless connection using appropriate conventional communication protocols and/or data port interfaces. In general, connection 120 can be any communication channel that allows transmission of data between the devices. In one embodiment, for example, devices may be provided with data ports, such as USB™, SCSI, FIREWIRE™, and/or BNC ports for transmission of data through the appropriate connection 120. The communication links could be wireless links or wired links or any combination that allows communication between computing devices 110, server 130, print controller 175, and printers 170. For example, in one embodiment, printer 170-5 may be shared and computer 110-1 may permit access to printer 170-5 over network 140 using connection 120.

Printers 170 may be controlled by hardware, firmware, or software, or some combination thereof. Printers 170 may include one or more print controller boards 175, such as exemplary print controllers 175-1 and 175-2, which may control the operation of printers 170, and may also be capable of receiving printer capability and status requests for printers 170 and sending responses from printers 170 to the requesting device. In some embodiments, printers 170 may be controlled by firmware or software resident on memory devices in print controllers 175. In general, print controllers 175 may be internal or external to printers 170. Exemplary print controllers 175 may also be controlled in part by software, including print servers, printer drivers, or other software, running on computing devices 110, and/or server 130.

Printers, such as exemplary printer 170-1, may also include consoles 190 such as consoles 190-1 and 190-2, or other interfaces to allow configuration options to be set, passwords and/or user identification and authentication information to be entered, printer capability, and other status messages to be displayed. In some embodiments, configuration options may be set or displayed using a display or user-interface on a monitor for a computer coupled to printers 170. For example, user interfaces to set one or more configuration options on printer 170-1 may be displayed on console 190-1. For example, the print resolution, document sizes, color options, and other configuration parameters may be user-configurable.

Users may also be able to log in to a printer 170 to perform administrative functions such as to enable software or firmware on printer 170 to perform various functions. In some embodiments, the log in process may require a password or other user-authentication mechanism. For example, a user may be able to specify input trays 178 and/or output trays 179, secure printing options, and the use of automatic document feeders to allow batch processing of documents. Printers 170 may have multiple input trays 178 and/or output trays 179. Output trays 179 can hold printed documents that have been processed by a printer. If a document is printed securely, the user may be asked to enter information on exemplary console 190 before the document is released from a secure output tray 179 and/or printed to an output tray 179.

Exemplary server 130 and computers 110 may also include database software such as a database management system ("DBMS") and Application Programming Interfaces ("API"s) to facilitate the storing of information into and the obtaining of information from the DBMS. In some embodiments, server 130 and/or computers 110 may also run Simple Message Transfer Protocol ("SMTP") clients and/or servers, Simple Network Management Protocol ("SNMP") clients and/or servers, mail servers, applications to request capability information from peripherals including printers 170, applications to accept message based print requests from users and to send out SNMP and/or message-based requests to print or process documents, and routines to parse and process SMTP and SNMP requests and responses. In some embodiments, server 130 may also be capable of executing software to process message based printer capability responses, parse the responses, extract capability information, and store the capability information in a database.

A computer software application to obtain printer capability information for one or more printers 170 and/or print documents to printers 170 with appropriate capabilities may be deployed on one or more of the exemplary computers 110, server 130, print controllers 175, and/or printers 170, as shown in FIG. 1. For example, printer 170-1 may execute software or firmware that permits printer 170-1 to respond to message-based inquiries about its capabilities and accept print jobs for printing using message-based techniques. An independent application to respond to message-based printer capability inquiries and facilitate printing may also execute concurrently on printer 170-2. In another example, an application to respond to message-based printer capability inquiries and facilitate printing may be resident on server 130 or computer 110-1, and operate on printer 170-5. In general, applications may execute in whole or in part on one or more computers 110, servers 130, print controllers 175, and/or printers 170 in the system. The embodiments described herein are exemplary only and other embodiments and implementations will be apparent to one of ordinary skill in the art. In some embodiments, message-based capability queries to printer 170 may be delivered via e-mail or any another appropriate protocol.

Figure 2:
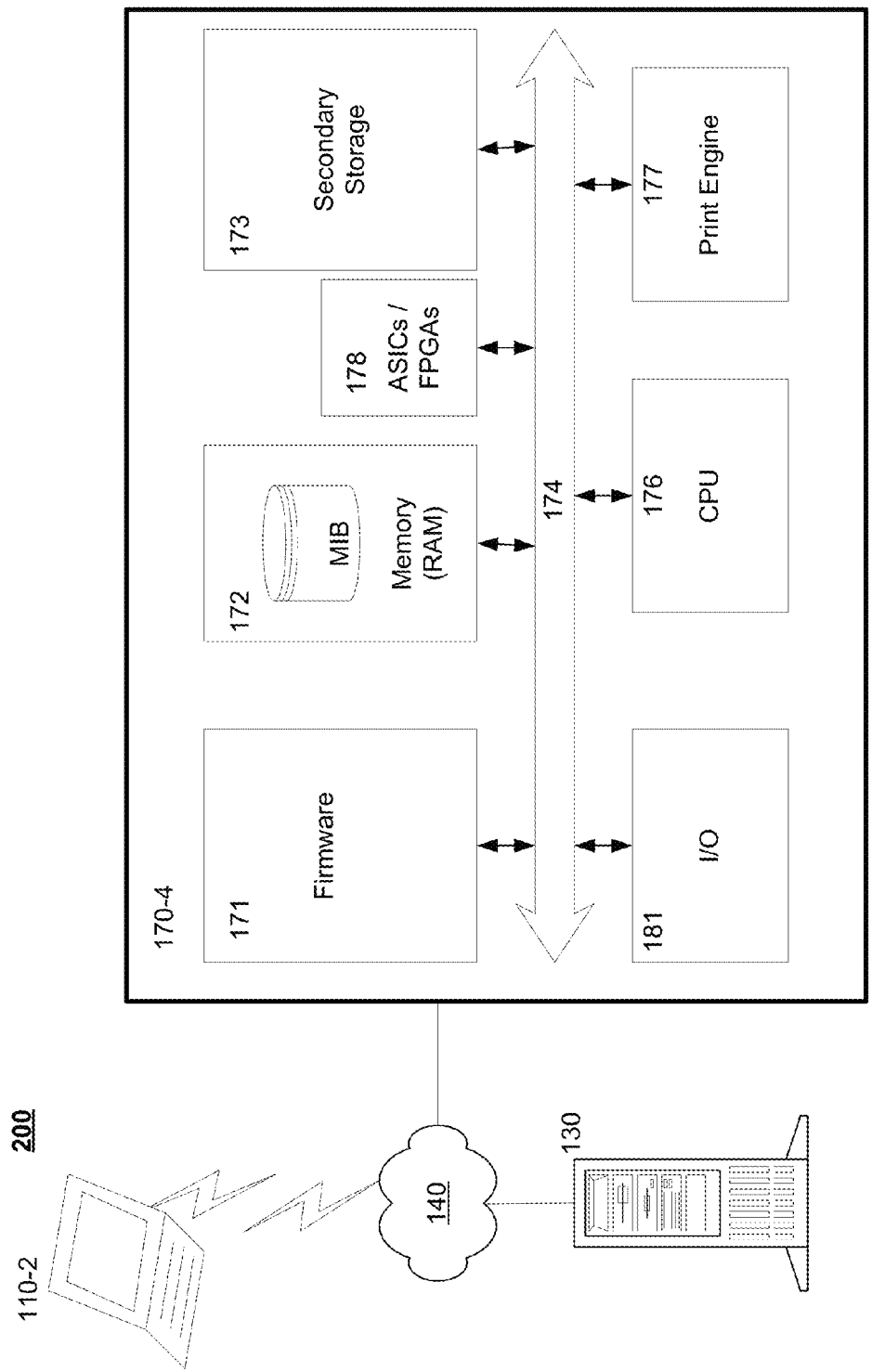
FIG. 2 shows a high-level block diagram of an exemplary printer coupled to a server and to a computing device wirelessly over a network.

FIG. 2 shows a high-level block diagram of exemplary printer 170-4 coupled to computing device 110-2 and server 130 wirelessly over network 140. Although, printer 170-4 has been shown and described in relation to FIG. 2, the description may also be applicable one or more of the other printers 170 shown in FIG. 1. Exemplary printer 170-4 may contain bus 174 that couples CPU 176, firmware 171, memory 172, input-output ("I/O") module 181, print engine 177, and secondary storage device 173.

Exemplary printer 170-4 may also contain other Application Specific Integrated Circuits (ASICs), and/or Field Programmable Gate Arrays (FPGAs) 178 that are capable of executing portions of an application to respond to message-based capability inquiries, and to accept message-based requests to print or process documents, and routines to parse and process SMTP and SNMP requests and responses. In some embodiments, exemplary printer 170-4 may also be capable of executing software including, a printer operating system, SMTP clients and/or servers, SNMP clients and/or servers, mail servers, mail parsing and conversion routines, database management software, software to process message based printer capability requests and print job requests, printer status request processing and printer configuration software, as well as other appropriate application software.

Exemplary I/O module 181 may also permit communication with server 130 and computer 110-2 over network 140. Information received from computers 110, server 130, and/or print controllers 175 may be processed by I/O module 181 and stored in memory 172. I/O module 181 may also notify CPU 176 about the communications. The communications may include data, commands, capability requests, status requests, SMTP requests and responses, SNMP and MIB requests and responses, job requests, and/or acknowledgements according to the communications protocol being used. CPU 176 may retrieve any information stored in memory 172 and process the information further.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for processing incoming requests and messages, composing outgoing responses and messages, routines for configuration management, routines for processing message based requests including routines for processing e-mail, SMTP messages, SNMP requests and data, document processing, and other code. In some embodiments, code and data in firmware 171 may be copied to memory 172 prior to being acted upon by CPU 176. Data and instructions in firmware 171 may be upgradeable using one or more of computer 110, server 130, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one of configuration management, message processing, and other print related algorithms.

Intermediate and final printable data, messages, printer status, and configuration information pertaining to one or more printers 170 may be stored in memory 172 or secondary storage 173. In some embodiments, "descriptions"—which provide information about printer capabilities, printer status information, alerts etc. may be stored in a Management Information Base ("MIB") in memory 172, secondary storage 173, or firmware 171. Information in the MIB as a whole may be viewed as describing the printer state. Information within the MIB pertaining to printer capabilities (sometimes called "Descriptions" in the Printer-MIB), status, and configuration can then be viewed as describing sub-states of the printer. Sub-state information can include information about a single capability, or a single configuration or status parameter; or it may include information about a set of capabilities, and/or sets of configuration and status parameters.

Note that information pertaining to some sub-states may be static (will not normally change), while others may be dynamic (changing). In the MIB, "descriptions" convey information about the configuration and capabilities of the printer and its various sub-units. This information is largely static information and does not generally change during the operation of the system. However, descriptions can change if the printer is repaired, reconfigured, redeployed, or upgraded. For example, sub-state capability information such as the number of output trays will not change for a printer unless a tray is removed or another tray added. Therefore, such information can be considered static. On the other hand, the sub-state status information pertaining to an input tray—such as whether the tray is full or empty can change rapidly. Therefore, such information can be considered dynamic.

In some embodiments, the information in the MIB may relate to the status of various parameters tracked by printer 170. In some embodiments, the values of objects may be obtained initially when the printer is reset or started-up and then updated periodically. In some embodiments, an interrupt may be used to inform CPU 176 that an update is needed or that one or more tracked parameters have changed. The MIB for a printer, or printer-MIB, is specified in various standards documents (such as RFC 1759 and/or RFC 3805).

The MIB structure is typically organized in terms of a System MIB (such as RFC 1213), a Host MIB (such as RFC 2790), and a Printer MIB, in which the following exemplary MIB objects can be used to maintain and obtain printer status.

System MIB
1. SysDescr
2. SysName
3. SysLocation

Host MIB
1. hrPrinterStatus

Printer MIB
1. prtGeneralPrinterName
2. prtCoverStatus
3. prtCoverDescription
4. prtinputStatus
5. prtMarkerSuppliesDescription
6. prtMarkerSuppliesLevel
7. prtAlertDescription Note that the description above is exemplary and for descriptive purposes only and may represent only a subset of the MIB objects available and/or tracked in a given printer. Various other MIB objects that are specified in the RFC may also be used according to the parameters tracked by a specific printer and/or the degree of printer status detail specified for retrieval. The System MIB lists several objects such as the exemplary SysDescr, SysName, and SysLocation objects listed above that specify the system description, system name and system location, respectively. The Host-MIB provides several status objects that can describe printer status in the context of two tables. For example, the hrPrinterStatus object can take on a range of values, where each value indicates a specific printer status. For example, the values may indicate whether the printer is busy, idle, warming up, or performing various other tasks.

The Printer MIB also includes several objects, which can be printer sub-states, such as the exemplary objects prtGeneralPrinterName, prtCoverStatus, prtCoverDescription, prtInputStatus, prtMarkerSuppliesDescription, prtMarkerSuppliesLevel, and prtAlertDescription. For the subset of objects listed above, object prtGeneralPrinterName specifies the printer name; object prtCoverStatus specifies the status of the printers covers and interlocks (i.e. whether any printer doors, trays, etc are open or closed); object prtCoverDescription specifies the manufacturer's name for the provided cover sub-mechanism; object prtinputStatus specifies the current status of the specified input sub-unit; object prtMarkerSuppliesDescription specifies the description of the marker (ink, toner etc) in the specified supply container or receptacle; object prtMarkerSuppliesLevel specifies the current level of the marker (if the specified supply is a container) or the remaining space (if this supply is a receptacle); and object prtAlertDescription, which further elaborates on a specified enumerated alert or provides information in the case where the alert code is classified as 'other' or 'unknown'.

Additional state or sub-state information that may be obtained from the MIB for printer 170-4 may include the number of input and output trays, the maximum capacity of each tray, the maximum and minimum physical dimensions of media that can be used by the various trays, printing modes such as duplex, marking technology (e.g. laser, inkjet, thermal, etc), maximum resolution, number of colors supported, print speed, etc.

Note also that the specification of standards above is exemplary only and various other established or de-facto standards may also be used to obtain printer state related information such as sub-states. In addition, ongoing updates to the standards, which are published and updated periodically by the Internet Society, the Internet Engineering Task Force, and other standard-setting organizations, may be used to update information contained in the MIB. The methods, systems, and apparatus disclosed herein may be easily adapted to any changes to the MIB structure, and/or to changes in information contained within the MIB as would be apparent to one of ordinary skill in the art.

As shown in FIG. 2, the MIB may be stored in memory 172 during operation. In some embodiments, the MIB may be stored in secondary storage 173 or firmware 171 and then loaded into memory 172 when the printer is powered on. Portions of the MIB may be updated periodically or in response to specific requests. The MIB may be updated by CPU 176, which may periodically obtain status from various components and sub-assemblies of printer 170-5. For example, CPU 176 may monitor its interrupts, and read memory locations and/or registers on various components, and/or invoke applications to determine current status.

Note that exemplary printer 170-4 may be capable of providing the MIB information, when requests are made in accordance with SNMP over network 140. In some embodiments, exemplary server 130 may send SNMP requests to printer 170-4 to obtain information pertaining to printer substates, including printer capability. Note that various other methods and protocols may also be used by server 130 to obtain printer state related information including sub-state information from printers 170. For example, Printer Job Language ("PJL") may be used to obtain state-related information. Other protocols that may be used include (without limitation) various XML-based protocols. One such example is Job Definition Format ("JDF"), which is an industry standard designed to simplify information exchange. JDF includes the Job Messaging Format ("JMF"), which is the language used to communicate between JDF agents and controllers. JMF allows a controller to communicate with JDF management information system or a workflow information system to obtain printer state related information. Note that various printer manufacturers may also use proprietary systems or de facto standards to enable server 130 or other devices to obtain printer state related information. For example, Microsoft™ offers Web Services on Devices ("WSD") protocol, which can also be used to access printer state related information by server 130. In general, server 130 may use one or more of various available mechanisms to obtain printer state related information depending on the protocol supported by the individual printers 170.

The requests from server 130 may be forwarded to CPU 176, which may obtain the requested information and generate a response to server 130. In some embodiments, server 130 may use network and/or operating system protocols to determine the various printers available on a network—such as a local area network ("LAN") and query each printer 170 using a supported protocol for capability information. In some embodiments, the queries may take the form of SNMP MIB requests. In some embodiments, the processing of SNMP and/or SMTP requests and responses may be performed by print controller 175.

In some embodiments, the responses to MIB requests received by server 130 may be parsed to extract capability information for storage in a printer sub-state or printer capability database. In some embodiments, each record in the database may correlate a printer identifier with capability information pertaining to the identified printer. For example, the printer identifier comprise the printer's network "name", or Internet Protocol ("IP") address, or Media Access Control ("MAC") address, and the identifier can be associated with capability information for that printer. In some embodiments, the identifier may serve as a primary or secondary key to obtain capability information for the identified printer from the printer sub-state or printer capability database, which can be a relational database.

In some embodiments, users may request printer capability information from server 130 using e-mail. For example, e-mail messages to an e-mail account "printer@organization_name.com" (where "organization_name.com" is part of the address of the organization) may be routed to server 130 and appropriate routines to parse and process the e-mail message may be invoked. In some embodiments, a user may query server 130 using computing device 110-2, which may be a mobile or handheld computing device. The user e-mail may be parsed to extract the desired printer capability information and then followed by a query to the database to obtain the requested capability. Finally, the requested information may be formatted and put into an e-mail response to the user.

Exemplary e-mail queries are shown below for illustrative purposes along with a comment (delimited by "/*" and "*/") that briefly describes their functions. Various other formats and structure for the e-mail queries can be used as will be apparent to one of ordinary skill in the art.

```
@REQUEST - DUPLEX       /*Return printers with Duplex capability*/
@REQUEST - A3 paper     /*Return printers A3 paper capability*/
@REQUEST - DUPLEX AND A3 paper
                        /*Return printers with Duplex and A3
                        paper capability*/
@REQUEST                /*Return REQUEST "Help" information*/
@HELP                   /*Return general "Help" information*/
@QUERY - PRINT OPTION <PRINTER_NAME>
                        /*Return available printing options for
                        printer specified by "PRINTER_NAME"*/
@PRINT <PRINTER_NAME> /*Print email body and/or attachments at
                        printer specified by "PRINTER_NAME"*/
@QUERY - CAPABILITY <PRINTER_NAME>
                        /*Return printer capability information for
                        printer specified by "PRINTER_NAME"*/
```

The queries above may appear in the message body or in the subject line and the SMTP server on printer 170-4 or print controller 175 may be appropriately configured to process and respond to queries of the type shown above. For example, as shown above, the syntax for the command may comprise the delimiter "@" followed by the command "REQUEST" and a term indicating the nature of the request. Requests or queries may also include one or more logical operators such as AND, OR, NOT, etc. and parentheses to specify order of evaluation to permit users to identify printers that match more than one search criteria.

The printer may also be configured to support various other options to facilitate easier use. For example, e-mails sent to the printer that are unrecognizable may result in a response with general "Help" information. Similarly, if no sub-option, or an unrecognized or incoherent sub-option is specified with "@REQUEST" then the printer may interpret the message as a "@REQUEST" command and return "Help" information for the "@REQUEST" command.

Additional examples pertaining to various individual commands present in some embodiments are shown below. For example, when an e-mail message is sent to printer 170-5 or print controller 175 with the command "@REQUEST-DUPLEX" the response may return the various printers with duplex capabilities.

Message:
@REQUEST-DUPLEX
Response:
[PRINTERS]
Printer_1_Copy_Room
Printer_9_Second_Floor
Printer_3_Engineering
Message:
@REQUEST-A3 paper
Response:
[PRINTERS]
Printer_A_Mail_Room
Printer_X
Printer_3_Engineering As shown above, printer names returned that have duplex capability include "Printer_1_Copy_Room", "Printer_9_Second_Floor", "Printer_3_Engineering", and others. Similarly, printer names returned that have A3 paper capability include "Printer_A_Mail_Room", "Printer_X", and "Printer_3_Engineering". Accordingly, the request "DUPLEX AND A3 paper" would return "Printer_3_Engineering," which has both capabilities. The examples above are for illustrative purposes only and server 130 may be configured to support a wide variety of request commands.

If one of the printers returned is deemed adequate by the user then the user may send another e-mail message to "printer@organization_name.com" to request printing of the job. For example, the "@PRINT<PRINTER_NAME>" may be used to specify that the job is to be printed at the printer identified by "PRINTER_NAME".

In some embodiments, printers 170 may support additional queries, for example by using the command "@QUERY-PRINT OPTION<PRINTER_NAME>" a user can determine printing options supported by the printer "PRINTER_NAME" that may be included as part of the print request. In some embodiments, server 130 may determine the printing options available based on the capabilities of the printer.

[PRINT OPTIONS]
    @PMCMD DOCUMENT FORMAT=AUTO*/PDF/WORD/TIFF/ . . .
    @PMCMD PRINT DATA=ATTACHMENT/BODY/ALL*/ . . .
    @PMCMD PAGE RANGE=ALL*/("x-y", "x, y, z")/ . . .
    @PMCMD PAPER SIZE=A4/LTR*/A3/LGR(A4*)/ . . .
    @PMCMD COLOR MODE=BW*/COLOR(BW*)/ . . .
    @PMCMD COPIES=1*-100/ . . .
    @PMCMD DUPLEX=OFF*/AUTO/LEFT BIND/TOP BIND/ . . .
    @PMCMD STAPLE=OFF*/TOP LEFT/TOP RIGHT/ . . .
    @PMCMD SECURE MODE=OFF*/HOLD/HOLD+PASSWORD/
    @PMCMD NOTIFICATION=YES*/NO/ . . .

As indicated above, the response to the query command indicates that printer "PRINTER_NAME" supports specification of various options in a print command including the document format of the document, the portions of the e-mail sent that is to be printed, page ranges to print, paper size to be used, color mode, number of copies of the document to be printer, duplex options, stapling, secure mode printing, and notifications regarding job status. In secure mode, printer "PRINTER_NAME" may hold a print job until the user enters user-id and/or password information using a console 190 coupled to the specified printer. In some embodiments, commonly used options may be specified as default options—so that the user can omit the specification of options that are compatible with the print job being sent to the specified printer. In the example above, some default options are indicated in the response to the query with an asterisk ("*"). In some embodiments, an "AUTO" option is available—when the "AUTO" option is selected the printer may use data from the print job and/or internal sensors to automatically change configuration settings. For example, document formats and paper size may be automatically determined by the printer.

The user may specify one or more of the above print options in an e-mail message sent to server 130. Server 130 may parse the e-mail and send the job with the specified print options to printer "PRINTER_NAME". The receiving printer "PRINTER_NAME" can then print the job as specified by server 130. In embodiments, where printers 170 support message-based printing, server 130 may simply forward the e-mail to the specified printer 170. Printer 170 may then invoke routines to parse the incoming e-mail message and print the job as specified in the e-mail. An exemplary print command that can be sent to server 130 is shown below.

@PRINT<PRINTER_NAME>
    @PMCMD PRINT DATA=BODY+ATTACHMENT
    @PMCMD COLOR MODE=COLOR
    @PMCMD COPY=5
    @PMCMD STAPLE=TOP LEFT

As shown above, the print command for the printer specified by "PRINTER_NAME" indicates that both the body of the e-mail and all attachments to the e-mail are to be printer by receiving printer "PRINTER_NAME". Five copies of the job are to be printed in color and each copy is to be stapled in the top-left corner. In some embodiments, commands to printer 170 may be filtered prior to printing so that they will not appear in the printed document.

Printers 170 may also support various other queries including queries for printer and/or job status. For example, if the user print command includes the "NOTIFICATION" option—then the user may automatically notified via e-mail when the print job has completed, or if there is an error that temporarily prevents completion. In some embodiments, a "PREVIEW" command may also be available which may direct printer 170 to send a preview of the document to be printed to server 130 or to the user via e-mail.

Figure 3:
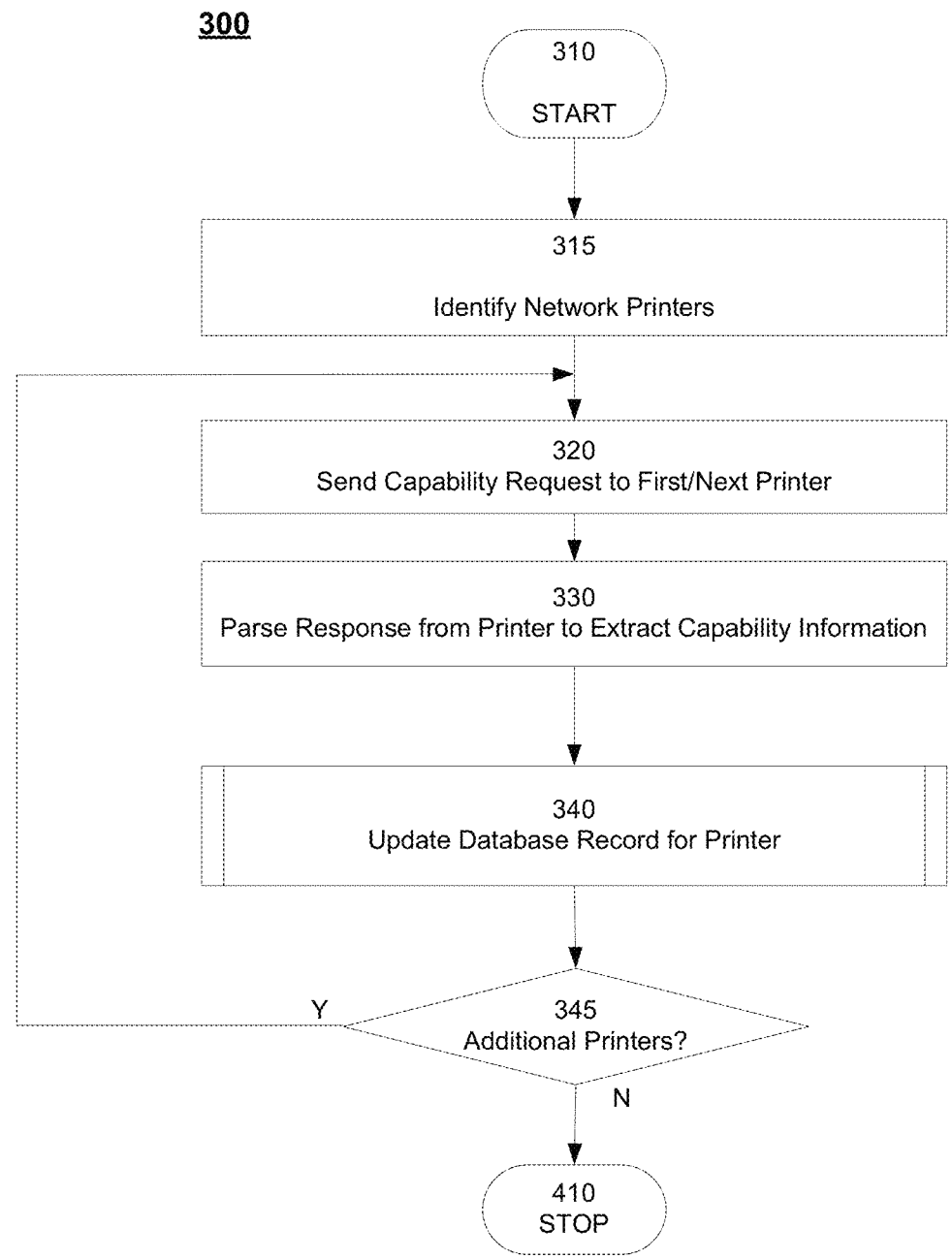
FIG. 3 shows a flowchart illustrating steps in an exemplary method 300 for obtaining printer and storing capability information.

FIG. 3 shows a flowchart illustrating steps in an exemplary method 300 for obtaining printer and storing capability information. In some embodiments, portions of the method may be performed by server 130 or computing devices 110. The process starts in step 310. Next, in step 315, network accessible printers 170 may be identified. In some embodiments, the network accessible printers 170 may be part of a LAN. In some embodiments, network databases or services provided by the operating system or may be used to identify network accessible printers. For example, server 130 may periodically check for updates to a network database that includes information pertaining to network accessible printers to determine if new printers have been added or if any printers have been removed.

In step 320, the first or next printer capability request may be sent to one of the identified network accessible printers 170. For example, an SNMP request for MIB information on a printer 170 may sent by server 130. In step 330, the response to the printer capability request may be parsed to extract printer capability information. For example, MIB data from printer 170 may be parsed and information pertaining to the capability of printer 170 may be extracted. Next, in step 340, the database record for printer 170 may be created (if it does not exist) or updated (if it exists) using the extracted information. If there are additional printers 170 that have not been processed that can be added to the database, or printers whose records need updating ("Y" in step 345) then the algorithm returns to step 320 to begin another iteration. For example, if there are additional network accessible printers coupled to network 140 that have not been processed previously, or existing printers 170 whose configuration may have changed then one of these printers 170 may be selected for processing during the next iteration. If there are no additional printers to be processed ("N" in step 345) the algorithm terminates. In some embodiments, method 300 may performed periodically by server 130 to ensure that the information in the database is current and accurate.

Table 1 below shows an exemplary organization for printer capability information in a relational database. As shown in Table 1, printers may be identified by one or more of "Printer_Name" and/or IP Address. In some embodiments, the MAC address of the printer may also be used to identify a printer 170. Information pertaining to various capabilities may be listed in the table. The "*" indicates that the field may occur multiple times for each printer record. For example, a printer may be capable of printing at different print resolutions.

In step 415, the first or next e-mail message may be received from a user. In some embodiments, an SMTP server or mail server in server 130 may receive the e-mail message. Next, in step 418, the e-mail request may be parsed to extract commands within the e-mail message. In step 420, the extracted commands may be checked to determine if the command is a query or status command.

If the command is a query or status command ("Y" in step 420) with search criteria pertaining to one or more sub-states then, in step 430, a query to the sub-state and/or printer capability database may be generated to identify printers that meet the search criteria. In some embodiments, one or more "callback functions" may be used by a SMTP server running on server 130 to generate the database queries. In some embodiments, the callback functions may invoke or use appropriate DBMS Application Programming Interfaces ("API"s) to generate the database queries and receive responses from the DBMS.

After processing the sub-state query, the DBMS may respond with current printer sub-state information such as capability or status information. In step 460, a reply e-mail including the information requested by the user may then be sent to the user identifying printers that meet the search criteria. In some embodiments, the data returned by the DBMS in response to the query may be processed and formatted before being sent to the user in a reply e-mail. The process then returns to step 415 to begin a subsequent iteration. Note that if the query is for "help" or for other information that may be available without a database query, then server 130 may

TABLE 1

| Printer_Name | IP Address | Duplex | Resolution* | Color | Paper Sizes* | ... | ... | ... |
|---|---|---|---|---|---|---|---|---|
| Printer_A | 192.1.168.2 | Y | 1200 dpi | Y | A4 | | | |
| | | | 600 dpi | | Letter | | | |
| | | | 300 dpi | | Legal | | | |
| | | | 150 dpi | | 11 × 17 | | | |
| Printer_X | 192.10.0.1 | N | 300 dpi | N | Letter | | | |
| ... | ... | ... | ... | ... | ... | ... | ... | ... |
| ... | ... | ... | ... | ... | ... | ... | ... | ... |
| Graphics_1 | 192.8.2.7 | Y | 2400 dpi | Y | 11 × 17 | | | |
| | | | 1200 dpi | | ... | | | |

In Table 1, information pertaining to duplex mode, resolution, color capability, and paper sizes has been shown. In general, the database may set up so that various capabilities are enumerated in a standardized manner to facilitate easy retrieval. When a user message with a "@REQUEST" string pertaining to one or more capabilities is requested, the e-mail may be parsed and routines or callback functions may be invoked to generate an appropriate query to the database. The data retrieved from the database may then be formatted and sent to the user in a reply e-mail.

Figure 4:
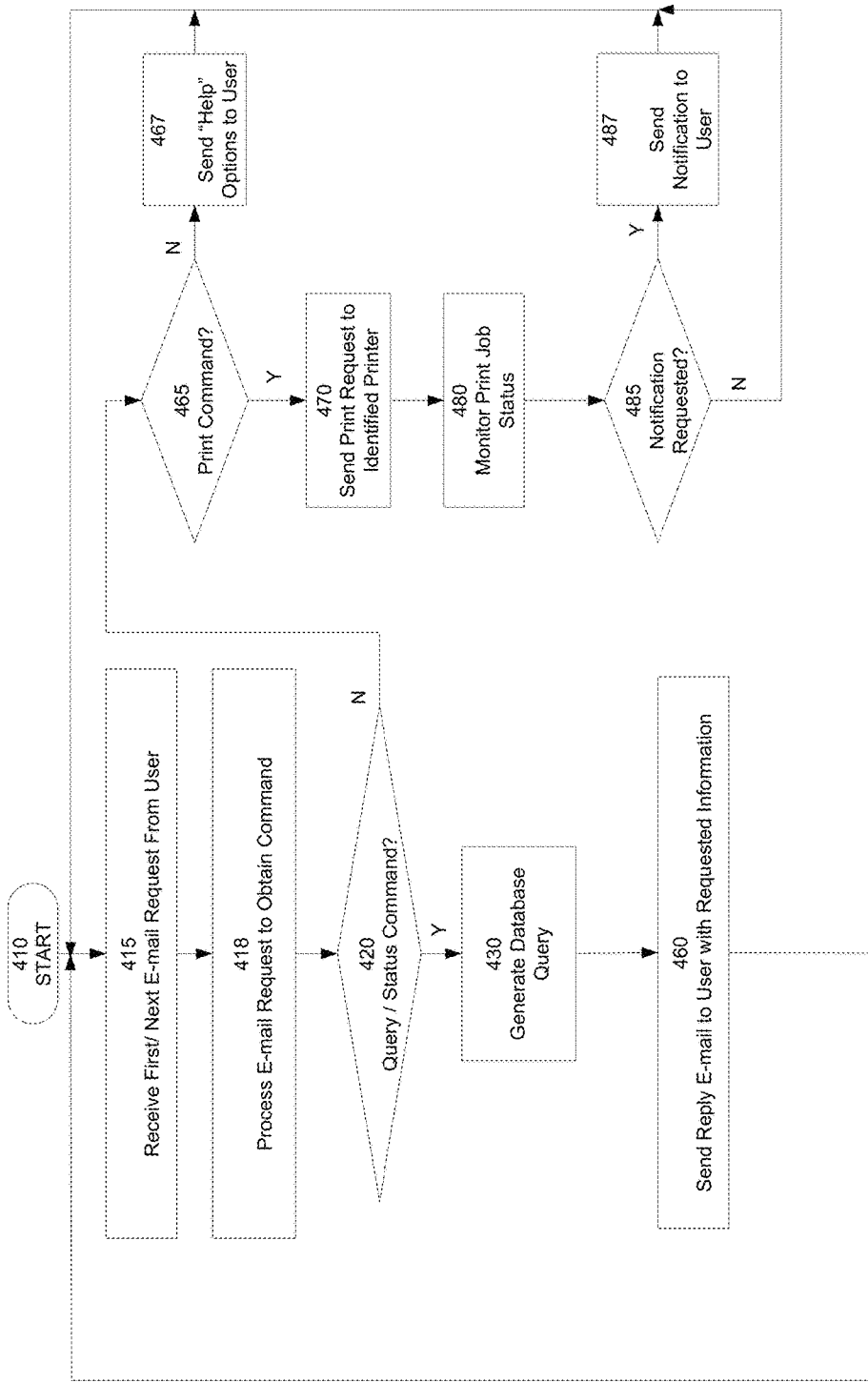
FIG. 4 shows a flowchart illustrating an exemplary method for message-based retrieval of capability information and printing.

FIG. 4 shows a flowchart illustrating an exemplary method 400 for message-based retrieval of capability information and printing. In some embodiments, portions of method 400 may be performed by server 130, computing devices 110, and/or print controller 175. For the purposes of this discussion, the messaging request is assumed to be an e-mail request although various other electronic messaging schemes that accept, forward, deliver and store messages on behalf of human users may also be used. In general, the method may be performed by any server 130 and/or computing device 110 that is capable of receiving, processing, and responding to e-mail messages with embedded commands. The process starts in step 410, where server 130 may be initialized and appropriate software may be loaded into memory.

respond directly via reply e-mail with the requested information without generating a query.

If the command is not a sub-state query ("N" in step 420) then, in step 465, the command may be checked to determine if the command is a print command. If the command is a print command ("Y" in step 465) then, in step 370, the print request may be processed in accordance with the options specified in the command. If the command is not a print command ("N" in step 465) (and if no other command types are available) then the command may be deemed unrecognized and "Help" options may be sent to the user in step 467. The algorithm then returns to step 415 to begin a subsequent iteration.

In step 470, the print command may be sent to the identified printer. In some embodiments, printers 170 may also be capable of accepting and processing print commands embedded in e-mail. In these implementations, the user's e-mail message may simply be forwarded to the printer by server 130. In implementations where printers 170 cannot accept print commands embedded in e-mail messages, server 130 may parse the e-mail, generate a print command for printer 170 based on the print options specified in the e-mail, and send a print command to the printer using conventional method such as Printer Job Language ("PJL"), Printer Control Language ("PCL") etc. For example, the print command embedded in the e-mail message to the user may be parsed to determine if one or more print options are present. For example, the print command may be parsed to determine if a print job notification or other options have been enabled by the user.

In step 480, the status of the print job sent to printer 170 may be monitored. In some embodiments, a print server running on server 130 and/or print controller 175 may be tasked with reporting status. In step 485, if a job notification has been requested ("Y" in step 385), then the print job may be monitored and event-based notifications may be sent to the user in step 387. For example, the user may be notified when the job is complete, or about any error conditions preventing completion, or when some specified number of pages or copies have been printed. If secure printing has been enabled then the user may be prompted via e-mail to retrieve the job. If no job notification has been requested ("N" in step 485), or the requested notification has already been sent (in step 487) then the algorithm returns to step 415 to begin a subsequent iteration.

Using disclosed embodiments, an employee, or an authorized visitor to an organizational facility may be able to print documents easily without the need to install printer drivers and other software. The user may simply send an e-mail message to an appropriately configured server at an easily-remembered e-mail address such as "printer@organization_name.com" to obtain printer state or sub-state information, including information about configuration, the capabilities of the printer, status information, print options, and help with commands etc. The commands embedded in the e-mail may be parsed by server 130, which can then send appropriate commands to direct printer 170 to print content, documents, and/or other attachments to the e-mail. Jobs may be sent to printer 170 for printing by server 130 using specified print options, and the sender can receive notifications about the print job status. In some embodiments, the tasks specified above may be performed by sending an e-mail message from a wireless handheld device such as a smart phone, Personal Data Assistant ("PDA"), netbook, and/or other computing devices that have e-mail capabilities.

In some embodiments, server 130 may be configured to recognize "user groups" from user e-mail addresses and may respond to capability queries based on information about capabilities available to the user group. For example, certain user groups may be prevented from utilizing specified printers in the organization. For example, in situations where server 130 determines that the e-mail originates from a member of a user group that is prohibited from using printer 170-1, then it may respond to requests pertaining to printer 170-1 by indicating that it is "unavailable". In other situations, server 130 may respond to a user request from a member of a specified user-group with a message that omits listing printers that the user is prohibited from utilizing. In general, server 130 may redact some sub-state information, or otherwise alter its response, if it determines that there are restrictions associated with the sender or the sender's user group. Accordingly, in some embodiments, servers 170 may be configured to enforce organizational policies pertaining to device usage. In some embodiments, methods 300 and 400 may be performed concurrently. For example, server 130 may respond to user commands embedded in e-mail messages, while concurrently updating the database to reflect any capability and/or printer changes.

In some embodiments, a program for conducting the process described in algorithms 300 and 400 can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A processor implemented method for identifying printers from among a plurality of network accessible printers based on printer state information, wherein the printer state comprises a plurality of sub-states, and the method comprises the processor implemented steps of:
   receiving an email message, wherein the e-mail message comprises at least one of a query or status command with search criteria pertaining to at least one printer sub-state or a command for printing documents;
   parsing the received email message and determining whether the received email message comprises the query with search criteria pertaining to at least one printer sub-state or the status command;
   when it is determined that the received email message comprises the query or the status command with search criteria pertaining to at least one printer sub-state:
   querying a database based on the search criteria pertaining to the at least one printer sub-state to obtain a set of printers that satisfy the search criteria, wherein the database comprises information that correlates printer identification information with corresponding printer sub-state information of the plurality of network accessible printers, and
   responding to the received e-mail message, wherein the e-mail response comprises identification information about printers in the set of printers that satisfy the search criteria; and
   when it is determined that the received email message does not comprise the query or the status command with search criteria pertaining to at least one printer sub-state, determining whether the received email message comprises the print command.

2. The processor implemented method of claim 1, wherein querying the database based on the search criteria pertaining to the at least one printer sub-state comprises:
   parsing the e-mail message to extract search criteria pertaining to the at least one sub-state;
   composing a database query based on the extracted search criteria pertaining to the at least one sub-state; and
   querying the database using the composed database query.

3. The processor implemented method of claim 1, wherein information pertaining to the at least one sub-state comprises at least one of
   printer capability information,
   printer configuration information, or
   printer status information.

4. The processor implemented method of claim 1, wherein the method is performed on at least one of:

a server coupled to the network accessible printers over a network; or a computer coupled to the network accessible printers over a network.

5. The processor implemented method of claim 4, wherein the coupling is wireless.

6. The processor-implemented method of claim 1, wherein the received e-mail message is sent from a computing device.

7. The processor-implemented method of claim 6, wherein the computing device is a smart phone.

8. The processor-implemented method of claim 1, wherein responding to the received e-mail message further comprises:
   determining a user-group associated with the sender of the received e-mail message;
   ascertaining if any restrictions associated with the user group apply to the identified printers;
   redacting the set of identified printers in accordance with the restrictions associated with the user group; and
   responding to the received e-mail message using the redacted set.

9. The processor-implemented method of claim 1, wherein responding to the received e-mail message comprises sending help information to sender, if the received e-mail message is incoherent.

10. The processor-implemented method of claim 1, wherein the printer sub-state information in the database is derived from Management Information Bases of the plurality of network accessible printers.

11. The processor implemented method of claim 1, further comprising:
   if the email message comprises the command for printing documents, processing the command in accordance with the options specified by the command.

12. A non-transitory computer-readable medium including program instructions, which when executed by a computer, perform steps in a method for identifying printers from among a plurality of network accessible printers based on printer state information, wherein the printer state comprises a plurality of sub-states, and the method comprises the steps of:
   receiving an email message, wherein the e-mail message comprises at least one of a query or status command with search criteria pertaining to at least one printer sub-state or a command for printing documents;
   parsing the received email message and determining whether the received email message comprises the query with search criteria pertaining to at least one printer sub-state or the status command;
   when it is determined that the received email message comprises the query or the status command with search criteria pertaining to at least one printer sub-state
   querying a database based on the search criteria pertaining to the at least one printer sub-state to obtain a set of printers that satisfy the search criteria, wherein the database comprises information that correlates printer identification information with corresponding printer sub-state information of the plurality of network accessible printers, and
   responding to the received e-mail message, wherein the e-mail response comprises identification information about printers in the set of printers that satisfy the search criteria; and
   when it is determined that the received email message does not comprise the query or the status command with search criteria pertaining to at least one printer sub-state, determining whether the received email message comprises the print command.

13. The computer-readable medium of claim 12, wherein querying the database based on the search criteria pertaining to the at least one printer sub-state comprises:
   parsing the e-mail message to extract search criteria pertaining to the at least one sub-state;
   composing a database query based on the extracted search criteria pertaining to the at least one sub-state; and
   querying the database using the composed database query.

14. The computer-readable medium of claim 12, wherein information pertaining to the at least one sub-state comprises at least one of
   printer capability information,
   printer configuration information, or
   printer status information.

15. The computer-readable medium of claim 12, wherein the method is performed on at least one of:
   a server coupled to the network accessible printers over a network; or
   a computer coupled to the network accessible printers over a network.

16. The computer-readable medium of claim 12, wherein the coupling is wireless.

17. The computer-readable medium of claim 12, wherein the received e-mail message is sent from a computing device.

18. The computer-readable medium of claim 17, wherein the computing device is a smart phone.

19. The computer-readable medium of claim 12, wherein responding to the received e-mail message comprises:
   determining a user-group associated with the sender of the received e-mail message;
   ascertaining if any restrictions associated with the user group apply to the identified printers;
   redacting the set of identified printers in accordance with the restrictions associated with the user group; and
   responding to the received e-mail message using the redacted set.

20. The computer-readable medium of claim 12, wherein the printer sub-state information in the database is derived from Management Information Bases of the plurality of network accessible printers.

21. The computer-readable medium of claim 12, wherein the method further comprising:
   if the email message comprises the command for printing documents, processing the command in accordance with the options specified by the command.

22. A non-transitory computer-readable memory including program instructions, which when executed by a computer, perform steps in a method for identifying printers from among a plurality of network accessible printers based on printer state information, wherein the printer state comprises a plurality of sub-states, and the method comprises the processor-implemented steps of:
   receiving an email message, wherein the e-mail message comprises at least one of a query or status command with search criteria pertaining to at least one printer sub-state or a command for printing documents;
   parsing the received email message and determining whether the received email message comprises the query with search criteria pertaining to at least one printer sub-state or the status command;
   when it is determined that the received email message comprises the query or the status command with search criteria pertaining to at least one printer sub-state:
   querying a database based on the search criteria pertaining to the at least one printer sub-state to obtain a set of printers that satisfy the search criteria, wherein the database comprises information that correlates printer identification information with corresponding printer substate information of the plurality of network accessible printers, and responding to the received e-mail message, wherein the e-mail response comprises identification information about printers in the set of printers that satisfy the search criteria; and when it is determined that the received email message does not comprise the query or the status command with search criteria pertaining to at least one printer sub-state, determining whether the received email message comprises the print command.

23. The computer-readable memory of claim 22, wherein information pertaining to the at least one sub-state comprises at least one of printer capability information,
printer configuration information, or
printer status information.

24. The computer-readable medium of claim 22, wherein the received e-mail message is sent from a smart phone.

25. The computer-readable memory of claim 20, wherein the method further comprises:

if the email message comprises the command for printing documents, processing the command in accordance with the options specified by the command.

* * * * *